United States Patent
Hall et al.

(10) Patent No.: US 9,031,719 B2
(45) Date of Patent: May 12, 2015

(54) PASSIVE LOCAL WIND ESTIMATOR

(71) Applicant: Prox Dynamics AS, Hvalstad (NO)

(72) Inventors: Alexander Philip Hall, Nesbru (NO); Trygve Frederik Marton, Slependen (NO); Petter Muren, Nesbru (NO)

(73) Assignee: Prox Dynamics AS, Hvalstad (NO)

( * ) Notice: Subject to any disclaimer, the term of this patent is extended or adjusted under 35 U.S.C. 154(b) by 143 days.

(21) Appl. No.: 13/855,124

(22) Filed: Apr. 2, 2013

(65) Prior Publication Data
US 2014/0129057 A1    May 8, 2014

Related U.S. Application Data

(60) Provisional application No. 61/618,897, filed on Apr. 2, 2012.

(30) Foreign Application Priority Data

May 25, 2012    (NO) .................................... 20120626

(51) Int. Cl.
G05D 1/00    (2006.01)
G05D 1/02    (2006.01)

(52) U.S. Cl.
CPC .................................... G05D 1/0202 (2013.01)

(58) Field of Classification Search
CPC . G08G 5/0021; G08G 5/0082; G08G 5/0091; G08G 5/0039; G08G 5/0052; G08G 5/0078; G08G 5/0086; G08G 5/025; G08G 5/045; G08G 5/0008; G08G 5/0013; G08G 5/0034; G01S 13/951; G01S 17/87; G01S 19/14; G01S 19/54; G01S 13/589; G01S 13/86; G01S 13/867; G01S 13/87; G01S 13/882; G01S 13/89; G01S 13/95; G01S 13/953; G01S 13/955; G01S 15/025

USPC ................. 701/3, 14, 18, 120, 301, 532, 528; 340/968, 945, 963, 971, 949, 959
See application file for complete search history.

(56) References Cited

U.S. PATENT DOCUMENTS 3,724,786 A *    4/1973    Adams et al. ................. 244/191
5,063,777 A    11/1991    Arethens et al.
(Continued)

FOREIGN PATENT DOCUMENTS

DE    19906955 C1    10/2000
EP    2390670 A2    11/2011
(Continued)

OTHER PUBLICATIONS

NPL—Wind Field Estimation for Small Unmanned Aerial Vehicles (2010).*
(Continued)

*Primary Examiner* — John R Olszewski
*Assistant Examiner* — Truc M Do
(74) *Attorney, Agent, or Firm* — Christopher & Weisberg, P.A.

(57) ABSTRACT

Local wind fields can be predicted if both the airspeed and the ground speed of the helicopter are known. An aircraft that uses an inertial navigation unit, autopilot and estimator allows a measure of ground speed to be known with good certainty. The embodiments herein extends this system to allow an estimate of the local wind field to be found without actively using an airspeed sensor, but instead combining the measurements of an accelerometer and a drag force model and a model of controlled aerodynamics of the aircraft to estimate the airspeed, which again can be used to estimate the local wind speed.

22 Claims, 6 Drawing Sheets

Airspeed Feedback to Aerodynamic Calculations

(56) References Cited

U.S. PATENT DOCUMENTS

| | | | |
|---|---|---|---|
| 6,757,624 B1* | 6/2004 | Hwang et al. | 702/50 |
| 6,807,468 B2* | 10/2004 | Campbell | 701/14 |
| 6,819,983 B1* | 11/2004 | McGraw | 701/4 |
| 7,248,967 B2* | 7/2007 | Hagstedt | 701/507 |
| 7,286,913 B2* | 10/2007 | Bodin et al. | 701/11 |
| 7,299,130 B2* | 11/2007 | Mulligan et al. | 701/13 |
| 7,509,212 B2* | 3/2009 | Bodin et al. | 701/528 |
| 7,865,289 B2* | 1/2011 | Dellac et al. | 701/70 |
| 8,195,345 B2* | 6/2012 | Omar et al. | 701/3 |
| 8,219,267 B2* | 7/2012 | Hamke et al. | 701/14 |
| 8,630,753 B2* | 1/2014 | Cahill | 701/7 |
| 8,744,700 B2* | 6/2014 | Beams et al. | 701/51 |
| 2004/0024500 A1 | 2/2004 | Campbell | |
| 2008/0039984 A1* | 2/2008 | Bitar et al. | 701/3 |
| 2008/0046171 A1* | 2/2008 | Bitar et al. | 701/208 |
| 2008/0168835 A1* | 7/2008 | Lassouaoui et al. | 73/170.11 |
| 2008/0306639 A1* | 12/2008 | Fleury et al. | 701/7 |
| 2009/0112535 A1* | 4/2009 | Phillips | 703/2 |
| 2009/0326824 A1* | 12/2009 | Naumov et al. | 702/3 |
| 2011/0238373 A1* | 9/2011 | Foster et al. | 702/183 |
| 2011/0295569 A1* | 12/2011 | Hamke et al. | 703/2 |
| 2012/0158220 A1* | 6/2012 | Accardo et al. | 701/15 |
| 2013/0013131 A1* | 1/2013 | Yakimenko et al. | 701/3 |
| 2013/0080043 A1* | 3/2013 | Ballin et al. | 701/120 |
| 2013/0085629 A1* | 4/2013 | Washington et al. | 701/15 |
| 2013/0131888 A1* | 5/2013 | Nutaro et al. | 701/1 |
| 2013/0226452 A1* | 8/2013 | Watts | 701/528 |

FOREIGN PATENT DOCUMENTS

| | | |
|---|---|---|
| GB | 2037688 A | 7/1980 |
| GB | 2312408 A | 10/1997 |

OTHER PUBLICATIONS

Norwegian Search Report dated Feb. 28, 2013 for Norwegian Application No. 20120626, filed on May 25, 2012 consisting of 2 pages.
International Search Report and Written Opinion dated Jul. 9, 2013 for International Application No. PCT/EP2013/057026, International Filing Date: Apr. 3, 2013 consisting of 11-pages.

* cited by examiner

PASSIVE LOCAL WIND ESTIMATOR

CROSS-REFERENCE TO RELATED APPLICATION

This application is related to and claims priority to U.S. Provisional Patent Application Ser. No. 61/618,897, filed Apr. 2, 2012, entitled PASSIVE LOCAL WIND ESTIMATOR, and Norwegian Patent Application Serial No. 20120626, filed May 25, 2012, entitled METHOD AND DEVICE FOR NAVIGATING AN AIRCRAFT, the entirety of which is incorporated herein by reference.

STATEMENT REGARDING FEDERALLY SPONSORED RESEARCH OR DEVELOPMENT n/a

FIELD OF THE INVENTION

The embodiments herein relate to navigating/controlling an aircraft by using an estimate of a local wind field in the proximity of the aircraft, for example an Unmanned Aerial Vehicle (UAV).

BACKGROUND OF THE INVENTION

Modern warfare and law enforcement are characterized by an increasing need for up-to-date situational awareness. To track down, or to protect against, criminals, paramilitary forces or terrorists, law enforcement personnel and soldiers often have an immediate need for information about what is around the next corner or over the hill.

Hostile forces frequently hide themselves from view or exploit the local terrain to gain tactical advantage or escape from pursuers. In the presence of hostile forces, a simple brick wall, barbed wire fence, a body of water, buildings or even a large open area can be an insurmountable obstacle when time is of the essence and tactical resources are unavailable. An active or undetected threat can make the situation dangerous.

Visible indications, noises or predictable actions can reveal friendly forces and put them at risk. Stealth and surprise, however, are important elements that can give a tactical advantage. An UAV is an aircraft with no pilot on board (also referred to herein as NUAV, where N is an abbreviation for Nano). UAVs can be remotely controlled (e.g. flown by a pilot/operator at a remote ground control station using a controller) or it can fly autonomously based on pre-programmed flight plans or more complex dynamic automation systems. An UAV may also be referred to as a drone. UAVs equipped with video cameras and positioning devices transmit live pictures and positioning information to the operator of the UAV and allows their operator to perform surveillance tasks and gather information from a safe position without exposing themselves.

An UAV may be operated and controlled using a remote control. Traditionally an UAV is operated by controlling such as e.g. a joystick. In addition to a joystick, the remote control configured to operate and control the UAV is usually also supplemented with a Graphical User Interface (GUI). A GUI may be a flight display providing e.g. different dynamic navigation information like speed, direction, waypoints etc.

All aircrafts need information about their local wind field to perform navigation—this includes UAVs. Smaller UAVs are more susceptible to atmospheric influences than larger UAVs or manned aircrafts and, therefore, require some method of identifying the current local wind field. In many instances, for these aircrafts, knowing the wind field will not aid an autopilot function in order to navigate the aircraft, but rather allow the aircraft to be positioned in a more advantageous orientation with respect to the wind.

Determination of the local wind field is most commonly achieved through the use of direct airspeed and ground speed measurements. The aircraft obtains information about its ground speed by using a combination of its GPS and inertial sensors. The aircraft obtains information about its direct airspeed by using a pilot (dynamic air pressure) probe. GPS sensor modules have become, in recent years, small and accurate enough to be carried in almost all aircrafts—this, however, does not apply to airspeed sensors.

The problem of being able to navigate the aircraft by using a measurement of the airspeed of an aircraft in one or more directions does usually not become an issue for most aircraft designers. It is simple to use a number of pressure sensors to measure airspeed on larger aircraft. This extends down to what is typically thought of as very small aircrafts, including aircrafts of only 100 g. Nano Unmanned Aerial Vehicles, however, are an order of magnitude smaller than this—approximately 15 g. Extending into this region necessitates that some cuts to system components of the aircraft are made—often the first to go is the airspeed sensors. This eliminates the possibility navigating the aircraft by using a direct measurement of the aircraft's airspeed.

If a small aircraft does not navigate by using a direct measurement of its airspeed it is difficult to use a measure the local wind field with any level of certainty. The problem of navigating the aircraft by using a calculation of the wind field from a known ground speed and airspeed is a known, solved problem.

SUMMARY OF THE INVENTION

An objective of embodiments herein is therefore to obviate at least one of the above disadvantages and problems and to provide improved navigation of the aircraft.

According to a first aspect, the object is achieved by a method in a device for navigating an aircraft. The device measures a ground speed associated with the aircraft. The device estimates an airspeed of the aircraft based on an acceleration $a_B$ of the aircraft and controlled aerodynamic forces applied to the aircraft and estimates a wind field experienced by the aircraft based on the ground speed and the airspeed. Based on the estimated wind field, the device navigates the aircraft.

In some embodiments, the device comprises an accelerometer configured to measure the acceleration $a_B$ of the aircraft. The aircraft may comprise a mass m. The device may multiply the acceleration $a_B$ with the mass m resulting in a required aircraft force for experienced motion $\vec{F}$. The device may calculate a controlled aerodynamics $\vec{F}_A$ by a model of the controlled aerodynamics $\vec{F}_A$ having at least a rotation rate $\vec{\omega}$ and a control state $\vec{\delta}$ of the aircraft as input in addition to a current estimate for the airspeed $\vec{V}_A$. The device may subtract the controlled aerodynamics $\vec{F}_A$ from the required aircraft force for experienced motion $\vec{F}$ resulting in a calculated drag force $\vec{F}_D$. And, the device may calculate an unfiltered airspeed $\vec{V}_A$ from the calculated drag force $\vec{F}_D$ by reverse calculation of a model of the drag force $\vec{F}_D$ being dependent on the unfiltered airspeed $\vec{V}_A$.

In some embodiments, the device subtracts the calculated unfiltered airspeed $\vec{V}_A$ from the measured ground speed $\vec{V}_G$ resulting in a calculated unfiltered wind speed $\vec{V}_W$.

In some embodiments, the device filters the calculated unfiltered wind speed $\vec{V}_W$ with a low pass filter resulting in a calculated filtered wind speed $\vec{V}_W$.

In some embodiments, the device subtracts the calculated filtered wind speed $\vec{V}_W$ from the measured ground speed $\vec{V}_G$ resulting in the current estimate for the airspeed $\vec{V}_A$.

In some embodiments, the device calculates the drag force $\vec{F}_D$ by:

$$\vec{F}_D = \text{sign}(\vec{V})\vec{C}_D \frac{1}{2}\rho \vec{A} \vec{V}^2$$

wherein $\vec{V}$ is the airspeed, $\vec{c}_D$ is a drag coefficient, $\rho$ is a mass density, and $\vec{A}$ is a reference area.

In some embodiments, the device calculates a wind magnitude and/or wind direction from the calculated filtered wind speed $\vec{V}_W$ and displays an indication of the wind magnitude and/or wind direction on a screen comprised in the aircraft.

In some embodiments, the indication is represented by an arrow which direction corresponds to the wind direction.

In some embodiments, the device colors the arrow so that one certain color indicates a wind magnitude within a certain wind magnitude interval.

In some embodiments, the airspeed is a local airspeed and wherein the wind field is a local wind field located in the proximity of the aircraft.

In some embodiments, the aerodynamics responsive to control state impacts are defined by the model of controlled aerodynamics $\vec{F}_A$.

In some embodiments, the aircraft is an Unmanned Aerial Vehicle, UAV.

According to a second aspect, the object is achieved by a device adjusted to navigate an aircraft. The device comprises means for measuring a ground speed associated with the aircraft and means for estimating an airspeed of the aircraft based on an acceleration $a_B$ of the aircraft and controlled aerodynamic forces applied to the aircraft. The device comprises means for estimating a wind field experienced by the aircraft based on the ground speed and the airspeed. Furthermore, the device comprises means for navigating the aircraft based on the estimated wind field.

In some embodiments, the aircraft comprises a mass m. In some embodiments, the device comprises an accelerator configured to measure the acceleration $a_B$ of the aircraft. The device may comprise a multiplier adjusted to multiply the acceleration $a_B$ with the mass m resulting in a required aircraft force for experienced motion $\vec{F}$. The device may comprise means for calculating a controlled aerodynamics $\vec{F}_A$ by a model of the controlled aerodynamics $\vec{F}_A$ having at least a rotation rate $\vec{\omega}$ and a control state $\vec{\delta}$ of the aircraft as input in addition to a current estimate for the airspeed $\vec{V}_A$. The device may comprise a first subtractor adjusted to subtract the controlled aerodynamics $\vec{F}_A$ from the required aircraft force for experienced motion $\vec{F}$ resulting in a calculated drag force $\vec{F}_D$. The device may comprise means for calculating an unfiltered airspeed $\vec{V}_A$ from the calculated drag force $\vec{F}_D$ by reverse calculation of a model of the drag force $\vec{F}_D$ being dependent on the unfiltered airspeed $\vec{V}_A$.

In some embodiments, the device comprises a second subtractor adjusted to subtract the calculated unfiltered airspeed $\vec{V}_A$ from the measured ground speed $\vec{V}_G$ resulting in a calculated unfiltered wind speed $\vec{V}_W$.

In some embodiments, the device comprises a low pass filter adjusted to filter the calculated unfiltered wind speed $\vec{V}_W$ resulting in a calculated filtered wind speed $\vec{V}_W$.

In some embodiments, the device comprises a third subtractor adjusted to subtract the calculated filtered wind speed $\vec{V}_W$ from the measured ground speed $\vec{V}_G$ resulting in the current estimate for the airspeed $\vec{V}_A$.

In some embodiments, the device comprises means for calculating the drag force $\vec{F}_D$ by:

$$\vec{F}_D = \text{sign}(\vec{V})\vec{C}_D \frac{1}{2}\rho \vec{A} \vec{V}^2$$

wherein $\vec{V}$ is the airspeed, $\vec{c}_D$ is a drag coefficient, $\rho$ is a mass density, and $\vec{A}$ is a reference area.

In some embodiments, the device comprises means for calculating a wind magnitude and/or wind direction from the calculated filtered wind speed $\vec{V}_W$, and means for displaying an indication of the wind magnitude and/or wind direction on a screen comprised in the aircraft.

In some embodiments, the indication is represented by an arrow which direction corresponds to the wind direction.

In some embodiments, the device comprises means for coloring the arrow so that one certain color indicates a wind magnitude within a certain wind magnitude interval.

In some embodiments, the airspeed is a local airspeed and wherein the wind field is a local wind field located in the proximity of the aircraft.

In some embodiments, aerodynamics responsive to control state impacts are defined by the model of controlled aerodynamics $\vec{F}_A$.

In some embodiments, the aircraft is an Unmanned Aerial Vehicle, UAV. The device may be comprised in the aircraft or in a remote control unit configured to control/navigate the aircraft.

In some embodiments, the means for measuring the ground speed is at least one of an inertial navigation unit, a Global Positioning System, GPS, unit and an autopilot.

Local wind fields can be predicted if both the airspeed and the ground speed of the aircraft are known. An aircraft that comprises an inertial navigation unit, an autopilot and an estimator allows a measure of the ground speed to be known with good or at least sufficient certainty. The embodiments herein extend this system to allow an estimate of the local wind field to be found without actively using an airspeed sensor.

All the aircraft's flight motions can be modeled with a well-known set of equations of motion—most often used to simulate aircraft motion. When examining the effect of wind upon an aircraft, the translation equations of motion are of most interest for use in prediction of the local wind field. Equation 1 shows the linear translation equations of motion as related to the aircraft motion.

$$m\vec{V} + m(\vec{\omega} \times \vec{V}) = m\vec{g} + \vec{F} \qquad 1$$

By using an estimator with good certainty levels, all but the applied forces can be easily calculated. This then gives a value for the applied forces ($\vec{F}$) that need to be predicted. These forces will be partly made up by controlled aerodynamic forces (e.g. applied to the main and tail rotors of the aircraft if the aircraft is exemplified as a helicopter) and partly by the drag applied to the aircraft's body. The controlled aerodynamic forces can be modeled as a function of the aircraft states—including airspeed, rotation rate and control settings. This can be calculated numerically by again using the estimate of the aircraft states (including control settings). This then leaves a force prediction, body drag, which must be produced by the airspeed onto the aircraft body (shown in equation 2).

$$\vec{F}_D = m\vec{V} + m(\vec{\omega} \times \vec{V}) - m\vec{g} - \vec{F} \qquad 2$$

Similar to the model for the controlled aerodynamic forces, the body drag can be modeled using the aircraft states. This model, however, will be dominated by the airspeed along the drag axis and gives a convenient method for calculating the aircraft airspeed from the remaining body drag. Equation 3 shows this relation.

$$\vec{V} = fn(\vec{F}_D) \qquad 3$$

This prediction for the current airspeed is then used with the ground speed in a continuous filter to produce an estimate of the local wind field. The filtered wind field is then used to produce a separate, filtered airspeed. The filtered version of the airspeed is then continuously used within the airspeed calculations.

In the following, when using the term local it is to be interpreted as in proximity, close to next to or near of the aircraft. Local is the opposite of a faraway wind field, which is a wind field located in a large distance from the aircraft.

A feature of this process is that it can produce an estimate for the wind speed. The estimate of the wind speed may be passively produced. A requirement of this method is that a reasonably high fidelity model of the more complicated aerodynamic components is known. Less emphasis is placed on the prediction of the airspeed and more emphasis is placed on the filtering of the output. This will minimize any errors produced within the aerodynamic model and allows a smooth stable wind field and airspeed prediction to be produced.

Generally, the embodiments herein can be said to estimate the local wind field of an aircraft by subtracting estimated airspeed from the measured groundspeed, wherein the airspeed is estimated based on measured acceleration of the aircraft, the applied controlled aerodynamic forces on the aircraft determined by a model of the aircraft's controlled aerodynamics as a function of rotation rate, control stated and airspeed estimation feedback, in addition to the coefficients of drag and the reference areas. The estimated airspeed is further low pass filtered to remove the high frequency components coming from e.g. turbulence. The resulting local wind field could be displayed as an arrow with an angle representing the local wind direction and a magnitude representing the wind speed projected in the horizontal plane.

The embodiments herein afford many advantages, of which a non-exhaustive list of examples follows:

An advantage of the embodiments herein is that they allow a higher overall system performance to be achieved as well as producing lower complexity when implementing the system.

Another advantage is that the embodiments herein reduces errors and allows a smooth stable wind field and airspeed prediction to be produced.

Furthermore, an advantage of the embodiments herein is that they allow positioning of the aircraft in a more advantageous orientation with respect to the wind.

Since the aircraft does not have to have a sensor for performing direct measurements the airspeed, the embodiments herein provides an advantage of reduced weight of the aircraft, reduced number of components comprised in the aircraft and a reduced complexity and cost of the aircraft. The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which.

Figure 1A:
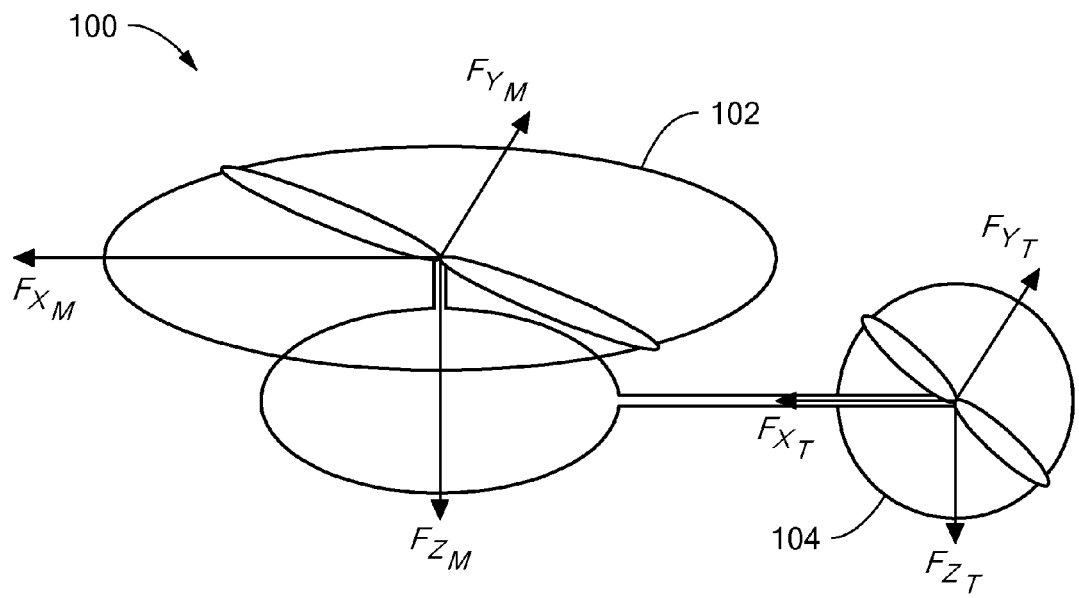
FIG. 1a is a schematic drawing illustrating an embodiment of an aircraft comprising a main rotor and a tail rotor.

The drawings are not necessarily to scale and the dimensions of certain features may have been exaggerated for the sake of clarity. Emphasis is instead placed upon illustrating the principle of the embodiments herein.

DETAILED DESCRIPTION OF THE INVENTION

In the following, the embodiments herein will be discussed and example embodiments described by referring to the accompanying drawings. Further, the different speeds referred to herein are defined as follows: The ground speed is the speed of the aircraft relative to the ground, the (local) wind speed is the speed of the air near the aircraft relative to the ground, the air speed is the speed of the air near the aircraft relative to the aircraft. There exist many methods for calculating the local wind field that surrounds an aircraft. These methods, however, require that both the ground speed and the airspeed of the aircraft are known. If these values are available they can be combined within a filter to produce estimates of the aircraft's local wind field. The process of filtering these values will be covered subsequently in the discussion of calculating the aircraft's airspeed.

To provide navigation based on information about the local wind field, there should be a filter to be used to calculate the local wind field and an estimate for the airspeed of the aircraft must first be known. A reliable airspeed estimate can be found by using a model of the aircraft that easily exposes the airspeed. By examining the aircraft equations of motion in the inertial reference frame we the relation shown in equation 4 is derived. This equation 4 can be used to model the response of an aircraft with regards to both internal and external forces.

$$m\vec{V} + m(\vec{\omega} \times \vec{V}) = m\vec{g} + \vec{F} \qquad 4$$

Wherein $\vec{V}$ is the airspeed, $\vec{\omega}$ is the rotation rate, m is the mass, $\vec{g}$ is acceleration due to gravity. In the above equation 4 the external forces, not including gravity, that are applied to the aircraft are represented by $\vec{F}$. For an aircraft such as e.g. a helicopter this can be thought of as the sum of the applied controlled aerodynamic forces (applied on the main and tail rotor), $\vec{F}_A$, and the forces applied to the body of the helicopter as drag, $\vec{F}_D$—this relation is shown below in equation 5.

$$\vec{F} = \vec{F}_A + \vec{F}_D \qquad 5$$

The reason for breaking the applied forces into these two specific components, $F_A$ and $F_D$, is due to the two distinct methods for modeling the forces. The applied controlled aerodynamic forces can be modeled with a variety of methods, but needs to have reasonable fidelity in the model. The modeling of the applied controlled aerodynamic forces must take into account the aircraft states that include airspeed, rotation rate, and control settings. This model allows the forces to be calculated easily, but does not easily allow a reverse calculation to find the airspeed. Whilst the reverse calculation may be possible, it will require significant computational overhead which is not available on many small UAVs. Conversely, calculation of the drag applied to the body of the aircraft is significantly simpler. A reasonable model can be created which allows reverse calculation to find the airspeed to be performed with minimal computational overhead.

When the separated forces, $F_A$ and $F_D$, are substituted into the aircraft equations of motion the resulting relation is shown in equation 6. This may then be rearranged to allow an estimate of the drag that is applied to the body to be calculated, shown in equation 7.

$$m\vec{V} + m(\vec{\omega} \times \vec{V}) = m\vec{g} + \vec{F}_A + \vec{F}_D \qquad 6$$

$$m\vec{V} + m(\vec{\omega} \times \vec{V}) - m\vec{g} - \vec{F}_A = \vec{F}_D \qquad 7$$

It should be noted that the estimate for the body drag that is produced by using equation 7 is the predicted force deficit that is required to produce the motion that has been observed. This includes calculating the predicted controlled aerodynamic forces. Calculation of the airspeed from the body drag estimate is covered later in the document.

Equation 7 can be rearranged to group the terms that are scaled by the aircraft mass, which produces equation 8.

$$m(\vec{V} + (\vec{\omega} \times \vec{V}) - \vec{g}) - \vec{F}_A = \vec{F}_D \qquad 8$$

It can be noted that the terms that are scaled by mass are equivalent to the body acceleration of the aircraft—shown in equation 9.

$$\vec{a}_b = \vec{V} + (\vec{\omega} \times \vec{V}) - \vec{g} \qquad 9$$

This body acceleration is measured directly by the accelerometers within an Inertial Measurement Unit (IMU) comprised in the aircraft. This relation conveniently allows the relation to calculate the body drag (equation 8) to be simplified to the one shown in equation 10.

$$m\vec{a}_b - \vec{F}_A = \vec{F}_D \qquad 10$$

By examining equation 10 it can be seen that there is very little burden placed on the monitoring and calculating the dynamics of the aircraft. The burden is placed on calculating the aerodynamics, both controlled and body drag, of the aircraft at each function evaluation.

To be able to produce an estimate for the aircraft's body drag, a model of the aircraft's controlled aerodynamics forces ($\vec{F}_A$) must be known. This model will typically be a complex function that takes into account a wide variety of the aircraft states, including airspeed ($\vec{V}$), rotation rate ($\vec{\omega}$), and control stated ($\vec{\delta}$)—shown in equation 11.

$$\vec{F}_A = fn(\vec{V}, \vec{\omega}, \vec{\delta}, \dots) \qquad 11$$

Figure 1B:
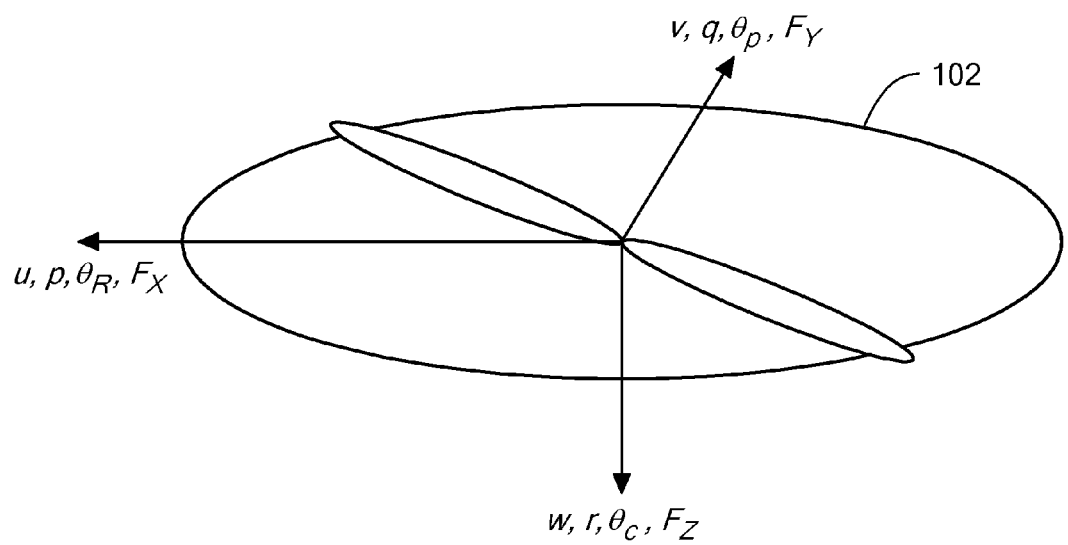
FIG. 1b is a schematic drawing illustrating embodiments of a main rotor.

In the following, one example of a model of a helicopter's controlled aerodynamics is described with reference to FIGS. 1a, 1b and 1c. In the case of a helicopter 100, be it large or small, the major aerodynamic components are the main 102 and tail rotors 104—this is shown in the FIG. 1a. The rotor illustrated to the left is the main rotor 102 and the rotor illustrated to the right in FIG. 1a is the tail rotor 104. In the following, the letter M indicates the main motor and T indicates the tail rotor. The arrows represent an x-y-z coordinate system for the main rotor 102 and for the tail rotor 104. The parameter $Fx_M$ represents the force on the main rotor 102 in the x-direction, $Fy_M$ represents the force on the main rotor 102 in the y-direction and $Fz_m$ represents the force on the main rotor 102 in the z-direction. The parameter $Fx_T$ represents the force on the tail rotor 104 in the x-direction, $Fy_T$ represents the force on the tail rotor 104 in the y-direction and $Fz_T$ represents the force on the tail rotor 104 in the z-direction. The main rotor 102 provides the predominant forces which allow the aircraft to be held in the air and maneuvered; whilst the tail rotor 104 provides directional stability and control. An aerodynamic model of both of these aerodynamic components can be produced by using a standard analysis tool and knowledge of any platform specific characteristics. As an example, the Prox Dynamics PD-100 Black Hornet Nano Unmanned Aircraft is used to demonstrate this procedure for a helicopter's main and tail rotors.

Aerodynamic performance of main 102 and tail 104 rotors will depend largely on the current flight state of the aircraft itself. This includes the body translational speeds ($\vec{V}$ or u, v, w); the body rotational rates ($\vec{\omega}$ or p, q, r); and the main and tail rotor control states ($\vec{\delta}$ or $\omega_M$, $\theta_C$, $\theta_P$, $\theta_R$, $\omega_T$). These states dominate the performance of the rotors and thus provide the basis for an aerodynamic model.

For the main rotor 102, forces in each of the three components need to be used to ensure that an accurate model is produced. A diagram of the aircraft states used and the resulting forces is shown in the FIG. 1a and the resulting force relationship, $F_M$, in three component form takes the form shown in equation 12.

$$\vec{F}_M = fn(\vec{V}, \vec{\omega}, \vec{\delta}) \qquad 12$$

By using an existing rotor analysis tool a representative model for each axis with respect to the above listed parameters can be found. Prox Dynamics uses a Blade Element Momentum Theory model that has been benchmarked against the physical helicopter performance to produce these models. After generating rotor performance data for a large, random range of aircraft states, a least squares method is used to generate the polynomial models. Equations 13 to 15 show the form that force equations for the example of Prox Dynamics PD-100 Black Hornet Nano Unmanned Aircraft take (not including the constants), wherein the parameters are based on the definitions in FIG. 1b, which illustrates the main rotor 102.

$$F_{X_M} = C_1\omega_M u + C_2\omega_M^2 \theta_R + C_3\omega_M^3 \theta_C \theta_R + C_4 u\theta_C \quad 13$$

$$F_{Y_M} = C_1\omega_M v + C_2\omega_M^2 \theta_P + C_3\omega_M^3 \theta_C \theta_P + C_4 v\theta_C \quad 14$$

$$F_{Z_M} = C_1\omega_M^2 + C_2\omega_M^2 \theta_C + C_3\omega_M w + C_4\omega_M u\theta_R + C_5\omega_M v\theta_R + C_6\omega_M^2 w\theta_C \quad 15$$

Figure 1C:
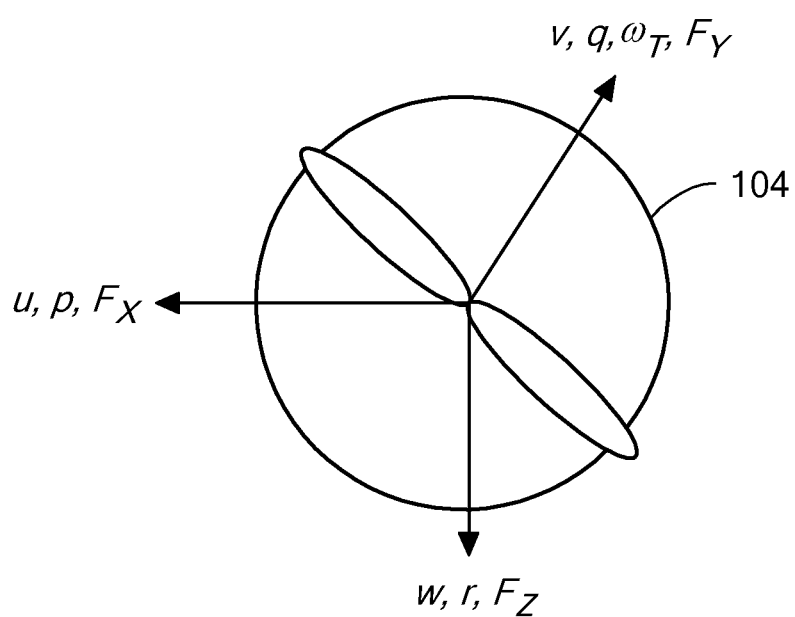
FIG. 1c is a schematic drawing illustrating embodiments of a tail rotor.

Producing a model for the tail rotor 104 is completed in a similar manner to that of the main rotor 102 and is based on the definitions in FIG. 1c, which illustrates the tail rotor 104. For this tail rotor 104, however, as the magnitude of the forces for the tail rotor 104 is smaller only the thrust produced by the tail ($F_Y$) is of interest. The relationship that is produced is shown in equation 16.

$$F_{Y_T} = C_1\omega_T^2 + C_2\omega_T v + C_3 v^2 \theta_P + C_4\omega_T^2 v \quad 16$$

The aerodynamic controlled forces are then calculated by summing all force components. For the PD-100 this is the sum of the main and tail rotors, as shown in equation 17.

$$\vec{F}_A = \vec{F}_M + \vec{F}_T \quad 17$$

The form that calculation of the controlled aerodynamic states takes may have any other suitable form. It should, however, be noted that the calculation of these forces will depend of the current aircraft states including the filtered airspeed. This airspeed is used as a feedback from the output of the wind field estimate and therefore will be susceptible to short term errors. These errors will be quickly eliminated due to the feedback within the filter.

After calculating the controlled aerodynamic forces an estimate of the body drag can be calculated—this estimate then needs to be related to the airspeed of the aircraft. Generally the drag on a given aircraft body will be mostly dependent to the velocity at which the aircraft is travelling. For an aircraft body this relation does not include the rotation rate of the control state. In its most simple form this relation may take the form shown in equations 18 and 19.

$$\vec{F}_D = (\vec{C}_D, \vec{A}, \vec{V}) \quad 18$$

$$\vec{F}_D = \text{sign}(\vec{V})\vec{C}_D \frac{1}{2}\rho\vec{A}\vec{V}^2 \quad 19$$

Equation 19 is derived from standard aerodynamics. It is a relationship that is commonly used to represent the drag on a given aircraft body. $\vec{C}_D$ denotes the vector of the coefficients of drag for each of the three aircraft axes, and $\vec{A}$ denotes the vector of the reference areas for each of the three aircraft axes. It can be seen that the relation representing body drag is only dependent on the aircraft velocity. This allows the airspeed of the aircraft to be calculated from the body drag without the need for complex inversion or too complex computation. By using this method an estimate for the airspeed of the aircraft at each time evaluation can be made, thus providing an input to the filter, with ground speed, to produce an estimate of the local wind field.

Once the airspeed and ground speed are known the wind speed can be estimated with the relation shown in equations 20 and 21. The wind speed estimate is not calculated directly from these relations, but rather an instant estimate for the wind speed is calculated and then used within a filter. This filter smooths the wind speed output and also allows the smoothed feedback of the airspeed, which is used within the controlled aerodynamic calculations.

$$\vec{V}_A = \vec{V}_G - \vec{V}_W \quad 20$$

$$\vec{V}_W = \vec{V}_G - \vec{V}_A \quad 21$$

Figure 2:
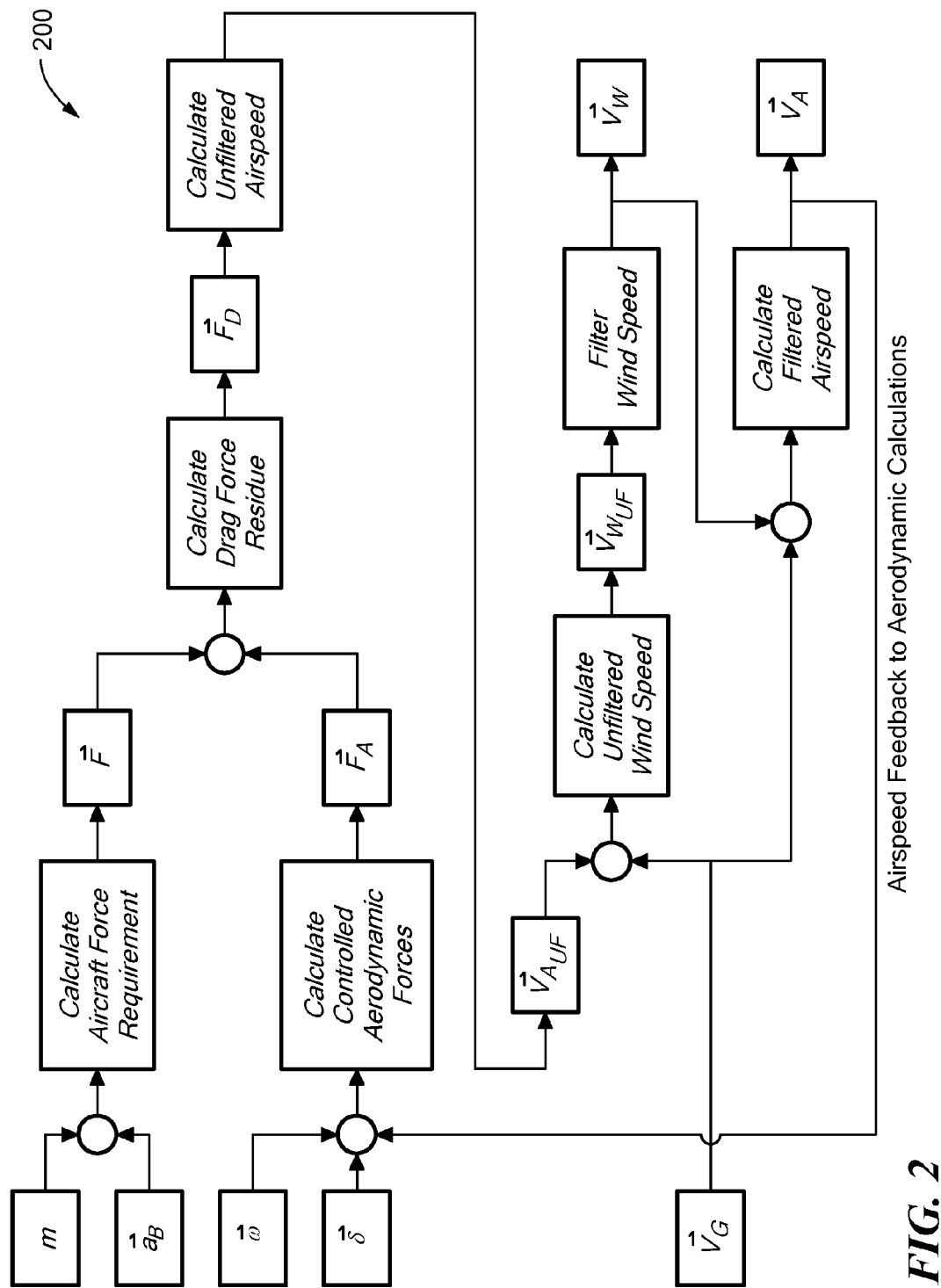
FIG. 2 is a flow chart illustrating a method in an aircraft for estimating a local wind field.

The process 200 disclosed above that is used to produce a local wind field estimate is further illustrated in the flowchart of FIG. 2. On the left hand side of this flowchart, the states that are taken from the aircraft sensor/estimator are shown. This includes the rotation rates, gravity, aircraft mass, measured acceleration, control states and ground speed. These input states are then used to calculate various parameters and finally the local wind field.

To begin, the measured acceleration used to calculate the force that is required by the aircraft to produce the currently experienced motion ($\vec{F}$) is calculated. In parallel the controlled aerodynamic forces ($\vec{F}_A$) are also calculated using the rotation rates, control states and the current estimate for the aircraft's airspeed. By combining these two values the drag which is allocated to be produced by the drag force ($\vec{F}_D$) is then calculated.

After the drag caused force ($\vec{F}_D$) has been calculated the airspeed ($\vec{V}_{A_{UF}}$) of the aircraft is then calculated. The model used to make this calculation depends on the aircraft being analysed. For example if a helicopter is being analysed, only the fuselage drag needs to be considered. If, however, another configuration is analysed this model will become more complex and may need to consider more aircraft states. It is important to note that the calculated airspeed is unfiltered and is not used as the airspeed within the aerodynamics calculations.

Once a prediction of the current unfiltered airspeed is known the unfiltered wind speed ($\vec{V}_{A_{UF}}$) is then calculated by combing the ground speed ($\vec{V}_G$) with the airspeed. A digital filter is configured to produce a smooth estimate of the local wind field ($\vec{V}_W$). The filter that is chosen will heavily depend on the dynamic performance of the aircraft that is under examination as well as the desired characteristics of the wind field estimate that is to be produced. For the Prox Dynamics PD-100 Black Hornet Nano Unmanned Aircraft a Type II Chebyshev filter is used with appropriate characteristics for the Prox Dynamics PD-100 Black Hornet Nano Unmanned Aircraft.

The filtered wind speed is then recombined with the ground speed estimate to produce a filtered estimate for the airspeed ($\vec{V}_A$). It is of note that this estimate should not be relied upon as an absolute reading of the aircraft's airspeed and generally should not be used within the aircraft's autopilot. In contrast to this point, this estimate is fed back to the beginning of the calculation cycle as the current estimate for the aircraft's airspeed.

By feeding back the filtered airspeed any inconsistent changes or errors produced within the estimation process to be taken into account in the next calculation. If an erroneous estimate is created it will be fed back into the calculation, thus causing a lower reading to be produced on the next cycle. This step allows the possibility of using a lower fidelity aerodynamic or drag model to be used.

As embodiments disclosed above focuses on providing a user level estimate of the local wind field a low pass filter, e.g. a Type II Chebyshev filter, is used. This low pass filter will eliminate higher frequency components of the wind (turbulence) and give a more realistic, smooth estimate of the wind field. It should be noted that more of the wind frequency domain is able to be captured if a higher fidelity estimator and aerodynamic model is used.

Within the filtering process three components of airspeed and ground speed are used to produce a three component estimate of the wind speed. Use of a three component estimation process allows subsequent calculation of the three components of airspeed to be produced, which is feed back into the aerodynamic calculations. The wind field that is displayed to the user needs only to be shown in the plane parallel to the earth's surface. These two components are combined to give a wind reading that is read in terms of direction and magnitude.

The above procedure should be processed at the aircraft's native autopilot frequency or as quickly as is feasible. This allows a higher overall system performance to be achieved as well as producing lower complexity when implementing the system.

As already indicated, the local predicted local wind field can be displayed in a user interface allowing the user to position the aircraft in a more advantageous orientation with respect to the wind. This can be done by displaying the calculated wind direction and wind magnitude indication on a user screen. As the wind estimate is only to be used for pilot reference, only the wind direction (with respect to north) and a traffic light wind magnitude indication need to be used by e.g. coloring the arrow in a predefined way so that one certain color indicates a local wind magnitude within a certain wind magnitude interval. The traffic light indication can be used to display either safe (green), warning (yellow), or unsafe (red) wind conditions are being experienced. Other suitable colors, patterns or means for indicating the wind conditions may be used instead of green, yellow and red.

Three examples of this indicating system are illustrated in FIG. 3 to demonstrate the function of the system. In each of the examples the aircraft configuration 300 is shown to the left and an example of the user interface 302 is shown to the right.

Figure 3A:
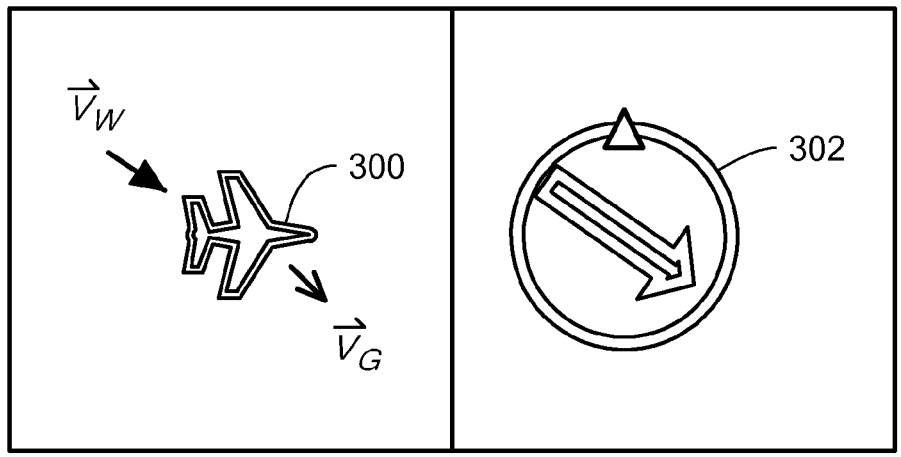
FIG. 3a is a schematic drawing illustrating embodiments of an aircraft configuration and user interface.

Firstly, in FIG. 3a, the aircraft configuration shown to the left in the figure illustrates that the aircraft is facing directly east and crabbing slowly towards the south east. During this flight configuration the aircraft is experiencing a safe level of wind from the north west. The traffic light indication shown to the right in FIG. 3a illustrates that the aircraft experiences a safe wind condition.

Figure 3B:
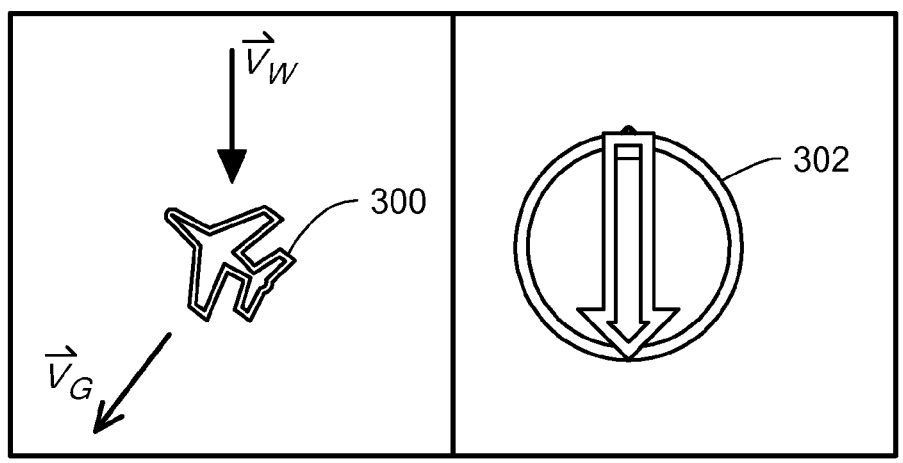
FIG. 3b is a schematic drawing illustrating embodiments of an aircraft configuration and user interface.

Secondly, in FIG. 3b, the aircraft configuration shown to the left in the figure illustrates that the aircraft is facing in a north west direction and is strafing to the left in a south westerly direction. During this flight the aircraft is experiencing a warning level of wind from the north shown by the traffic light indication illustrated to the right in FIG. 3b. The warning may be illustrated by using a yellow arrow.

Figure 3C:
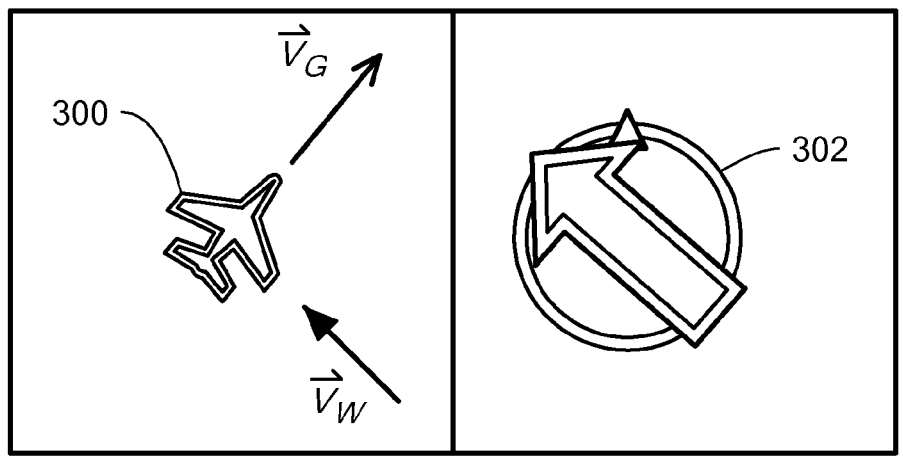
FIG. 3c is a schematic drawing illustrating embodiments of an aircraft configuration and user interface.

Finally, in FIG. 3c, the aircraft configuration shown to the left in the figure illustrates that the aircraft is placed flying forward directly to the north east. During this flight configuration an unsafe wind is striking the aircraft from the south east, directly into the aircraft's side shown by the traffic light indication illustrated to the right in FIG. 3b. The unsafe wind condition may be illustrated by using a red arrow.

The method implemented in a device 500 for navigating/controlling the aircraft, according to some embodiments will now be described with reference to the flowchart depicted in FIG. 4. The device having the reference number 500 refers to FIG. 5, which will be described in more detail later. The device 500 may be comprised in the aircraft or in e.g. a remote control unit configured to control/navigate the aircraft. In some embodiments, the device 500 comprises an accelerometer configured to measure the acceleration $a_B$ of the aircraft. The aircraft may comprise a mass m. The aircraft may be a UAV. The method comprises the following steps, which steps may as well be carried out in another suitable order than described below.

Step 401

The device 500 measures a ground speed associated with the aircraft.

Step 402

The device 500 estimates the airspeed of the aircraft based on an acceleration $a_B$ of the aircraft and controlled aerodynamic forces applied to the aircraft. The airspeed may be a local airspeed.

Step 401a

In some embodiments, the device 500 multiplies the acceleration $a_B$ with the mass m resulting in a required aircraft force for experienced motion $\vec{F}$.

Step 401b

In some embodiments, the device 500 calculates a controlled aerodynamics $\vec{F}_A$ by a model of the controlled aerodynamics $\vec{F}_A$ having at least a rotation rate $\vec{\omega}$ and a control state $\vec{\delta}$ of the aircraft as input in addition to a current estimate for the airspeed $\vec{V}_A$.

In some embodiments, the aerodynamics responsive to control state impacts are defined by the model of controlled aerodynamics $\vec{F}_A$.

Step 401c

In some embodiments, the device 500 subtracts the controlled aerodynamics $\vec{F}_A$ from the required aircraft force for experienced motion $\vec{F}$ resulting in a calculated drag force $\vec{F}_D$.

Step 401d

In some embodiments, the device 500 calculates an unfiltered airspeed $\vec{V}_A$ from the calculated drag force $\vec{F}_D$ by reverse calculation of a model of the drag force $\vec{F}_D$ being dependent on the unfiltered airspeed $\vec{V}_A$.

The drag force $\vec{F}_D$ may be calculated by:

$$\vec{F}_D = \text{sign}(\vec{V})\vec{C}_D \frac{1}{2}\rho \vec{A} \vec{V}^2$$

wherein $\vec{V}$ is the airspeed, $\vec{C}_D$ is a drag coefficient, $\rho$ is a mass density, and $\vec{A}$ is a reference area.

Step 401e

In some embodiments, the device 500 subtracts the calculated filtered wind speed $\vec{V}_W$ from the measured ground speed $\vec{V}_G$ resulting in the current estimate for the airspeed $\vec{V}_A$.

Step 403

The device 500 estimates a wind field experienced by the aircraft based on the ground speed and the airspeed.

The wind field may be a local wind field located in the proximity of the aircraft.

Step 403a

In some embodiments, the device 500 subtracts the calculated unfiltered airspeed $\vec{V}_A$ from the measured ground speed $\vec{V}_G$ resulting in a calculated unfiltered wind speed $\vec{V}_W$.

Step 403b

In some embodiments, the device 500 filters the calculated unfiltered wind speed $\vec{V}_W$ with a low pass filter resulting in a calculated filtered wind speed $\vec{V}_W$.

Step 403c

In some embodiments, the device 500 calculates a wind magnitude and/or wind direction from the calculated filtered wind speed $\vec{V}_W$.

Step 403d

In some embodiments, the device 500 displays an indication of the wind magnitude and/or wind direction on a screen comprised in the aircraft.

The indication may be represented by an arrow which direction corresponds to the wind direction.

Step 403e

In some embodiments, the device 500 colors the arrow so that one certain color indicates a wind magnitude within a certain wind magnitude interval.

Step 404

The device 500 navigates/controls the aircraft based on the estimated wind field.

Figure 4:
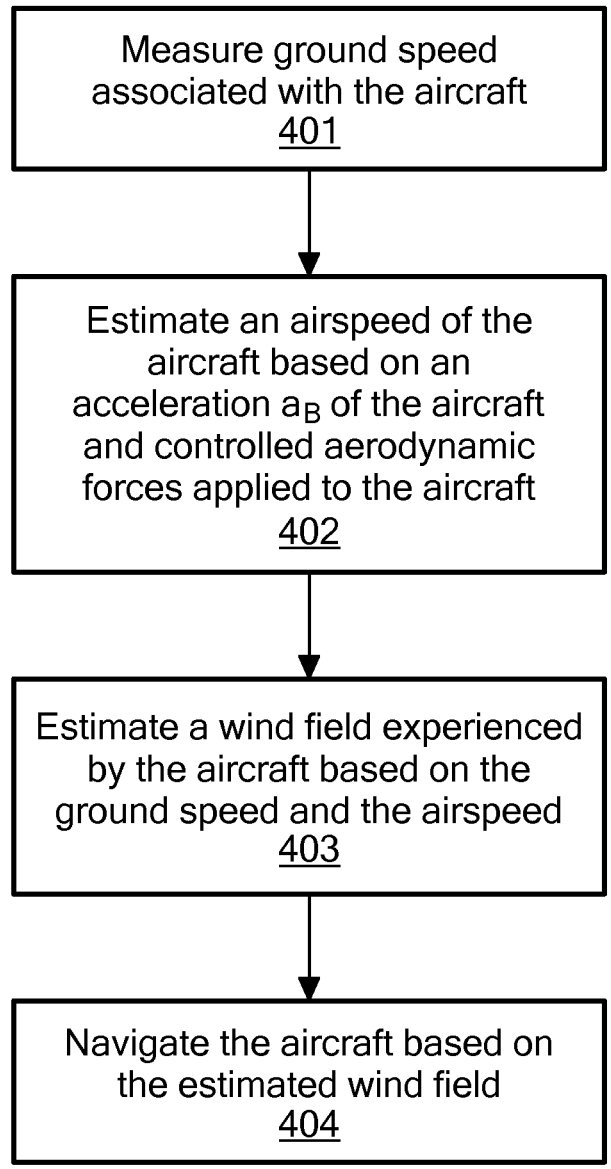
FIG. 4 is a flow chart illustrating embodiments of a method.
Figure 5:
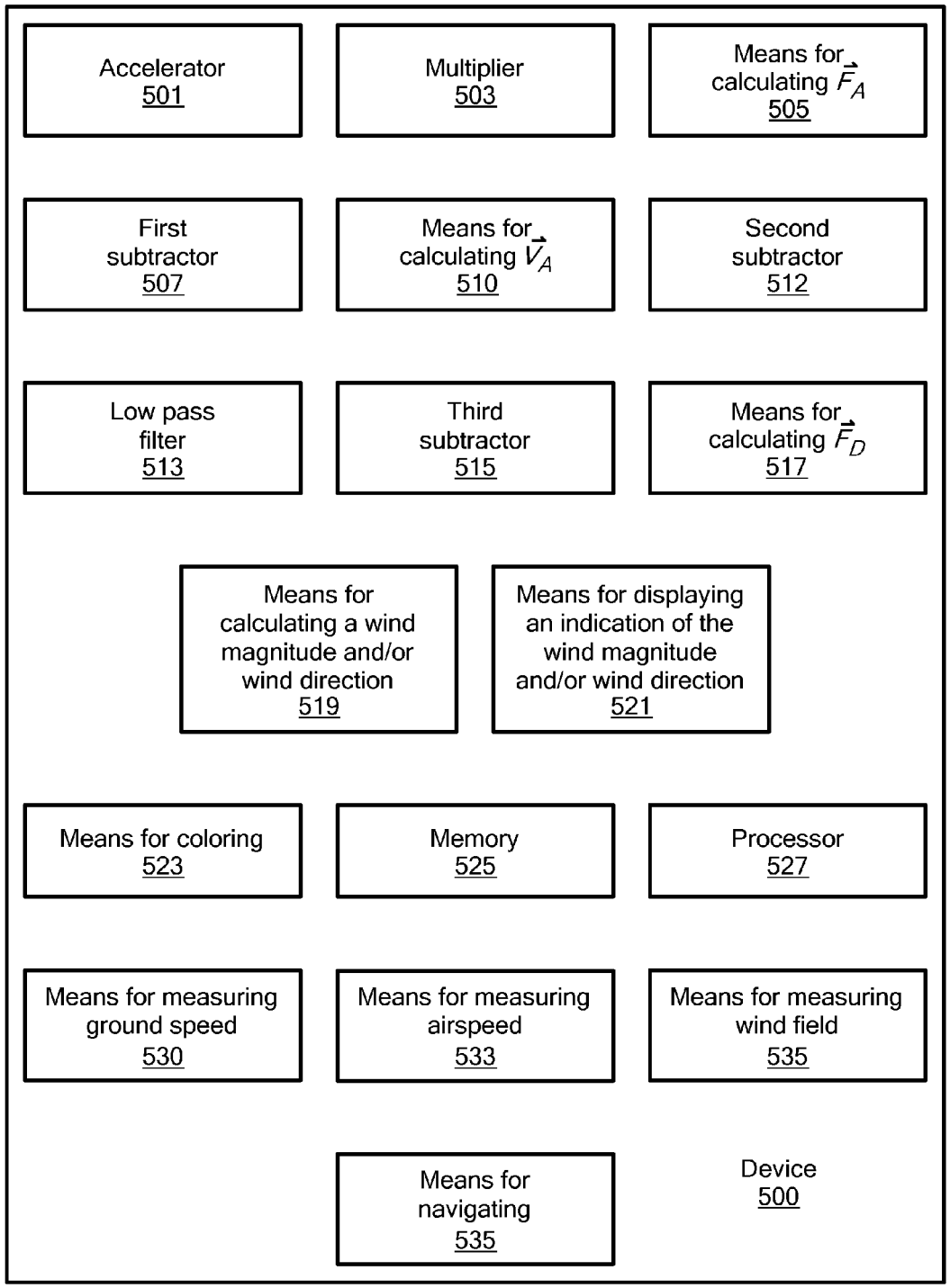
FIG. 5 is a schematic block diagram illustrating embodiments of a device.

To perform the method steps shown in FIG. 4 for navigating the aircraft, the device 500 comprises an arrangement as shown in FIG. 5. The aircraft may comprise a mass m. In some embodiments, the aircraft is a UAV. Even though FIG. 5 does not illustrate any connections between the different units, the skilled person will understand that there are any type of suitable connection means between the units illustrated in FIG. 5.

The device 500 comprises means 530 for measuring a ground speed associated with the aircraft. In some embodiments, the means for measuring the ground speed is at least one of an inertial navigation unit, a Global Positioning System, GPS, unit and an autopilot.

The device 500 comprises means 533 for estimating the airspeed of the aircraft based on an acceleration $a_B$ of the aircraft and controlled aerodynamic forces applied to the aircraft. In some embodiments, the airspeed is a local airspeed.

The device 500 comprises means 535 for estimating a wind field experienced by the aircraft based on the ground speed and the airspeed. In some embodiments, the wind field is a local wind field located in the proximity of the aircraft.

The device 500 comprises means for navigating 537 the aircraft based on the estimated wind field.

In some embodiments, the device 500 further comprises an accelerator 501 configured to measure the acceleration $a_B$ of the aircraft.

In some embodiments, the device 500 comprises a multiplier 503 adjusted to multiply the acceleration $a_B$ with the mass m resulting in a required aircraft force for experienced motion $\vec{F}$.

In some embodiments, the device 500 comprises means 505 for calculating a controlled aerodynamics $\vec{F}_A$ by a model of the controlled aerodynamics $\vec{F}_A$ having at least a rotation rate $\vec{\omega}$ and a control state $\vec{\delta}$ of the aircraft as input in addition to a current estimate for the airspeed $\vec{F}_A$.

In some embodiments, the device 500 comprises a first subtractor 507 adjusted to subtract the controlled aerodynamics $\vec{F}_A$ from the required aircraft force for experienced motion $\vec{F}$ resulting in a calculated drag force $\vec{F}_D$.

In some embodiments, the device 500 comprises means 510 for calculating an unfiltered airspeed $\vec{V}_A$ from the calculated drag force $\vec{F}_D$ by reverse calculation of a model of the drag force $\vec{F}_D$ being dependent on the unfiltered airspeed $\vec{V}_A$.

In some embodiments, the device 500 comprises a second subtractor 512 adjusted to subtract the calculated unfiltered airspeed $\vec{V}_A$ from the measured ground speed $\vec{V}_G$ resulting in a calculated unfiltered wind speed $\vec{V}_W$.

In some embodiments, the device 500 comprises a low pass filter 513 adjusted to filter the calculated unfiltered wind speed $\vec{V}_W$ resulting in a calculated filtered wind speed $\vec{V}_W$.

In some embodiments, the device 500 comprises a third subtractor 515 adjusted to subtract the calculated filtered wind speed $\vec{V}_W$ from the measured ground speed $\vec{V}_g$ resulting in the current estimate for the airspeed $\vec{V}_A$.

In some embodiments, the device 500 comprises means 517 for calculating the drag force $\vec{F}_D$ by:

$$\vec{F}_D = \text{sign}(\vec{V})\vec{C}_D \frac{1}{2}\rho A \vec{V}^2$$

wherein $\vec{V}$ is the airspeed, $\vec{C}_D$ is a drag coefficient, $\rho$ is a mass density, and $\vec{A}$ is a reference area.

In some embodiments, the device 500 comprises means 519 for calculating a wind magnitude and/or wind direction from the calculated filtered wind speed $\vec{V}_W$, and means 521 for displaying an indication of the wind magnitude and/or wind direction on a screen comprised in the aircraft. In some embodiments, the indication is represented by an arrow which direction corresponds to the wind direction.

In some embodiments, the device 500 comprises means 523 for coloring the arrow so that one certain color indicates a wind magnitude within a certain wind magnitude interval.

In some embodiments, aerodynamics responsive to control state impacts are defined by the model of controlled aerodynamics $\vec{F}_A$.

The device 500 may comprise a memory 525 comprising one or more memory unit. The memory 525 is arranged to be used to store data, the measured ground speed, the estimated airspeed, the estimated wind field, and the other parameters mentioned above, configurations, schedulings, and applications to perform the methods herein when being executed in the device 500.

The present mechanism for setting navigating the aircraft may be implemented through one or more processors, such as a processor 527 in device arrangement depicted in FIG. 5 together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the device 500. One such carrier may be in the form of a CD ROM disc. It is however feasible with other data carriers such as a memory stick. The computer program code can furthermore be provided as pure program code on a server and downloaded to the device 500.

Those skilled in the art will also appreciate that the means for measuring a ground speed, means for estimating an airspeed, means for estimating a wind field, means for navigating the aircraft, accelerator, multiplier, means for calculating a controlled aerodynamics $\vec{F}_A$, first subtractor, means for calculating an unfiltered airspeed $\vec{V}_A$, a second subtractor, a low pass filter, a third subtractor, means for calculating the drag force $\vec{F}_D$, means for calculating a wind magnitude and/or wind direction, means for displaying an indication of the wind magnitude and/or wind direction and means for coloring the arrow described above may refer to a combination of analog and digital circuits, and/or one or more processors configured with software and/or firmware, e.g. stored in the memory 525, that when executed by the one or more processors such as the processor 527 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The above description discloses different example embodiments for illustrative purposes. A person skilled in the art would realize a variety of different models of the aircraft's controlled aerodynamics and measurements of aircraft body acceleration within the scope of the embodiments.

The embodiments herein are not limited to the above described embodiments. Various alternatives, modifications and equivalents may be used. Therefore, the above embodiments should not be taken as limiting the scope of the embodiments, which is defined by the appending claims.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasized that the steps of the methods defined in the appended claims may, without departing from the embodiments herein, be performed in another order than the order in which they appear in the claims.

The above description discloses different example embodiments for illustrative purposes. A person skilled in the art would realize a variety of different models of the aircraft's controlled aerodynamics and measurements of aircraft body acceleration within the scope of the embodiments.

What is claimed is:

1. A method in a device for navigating an aircraft, the device including an accelerometer configured to measure an acceleration $a_B$ of the aircraft, the aircraft comprising a mass m, the method comprising:

measuring a ground speed associated with the aircraft;

estimating an airspeed of the aircraft based on the acceleration $a_B$ of the aircraft and controlled aerodynamic forces applied to the aircraft, estimating the airspeed of the aircraft including:

multiplying the acceleration $a_B$, with a mass m resulting in a required aircraft force for experienced motion $\vec{F}$;

calculating a controlled aerodynamics $\vec{F}_A$ by a model of the controlled aerodynamics $\vec{F}_A$ having at least a rotation rate $\vec{\omega}$ and a control state $\vec{\delta}$ of the aircraft as input in addition to a current estimate for the airspeed $\vec{V}_A$;

subtracting the controlled aerodynamics $\vec{F}_A$ from the required aircraft force for experienced motion $\vec{F}$ resulting in a calculated drag force $\vec{F}_D$; and calculating an unfiltered air speed $\vec{V}_A$ from the calculated drag force $\vec{F}_D$ by reverse calculation of a model of the drag force $\vec{F}_D$ being dependent on the unfiltered air speed $\vec{V}_A$;

estimating a wind field experienced by the aircraft based on the ground speed and the airspeed; and navigating the aircraft based on the estimated wind field.

2. The method of claim 1, wherein the estimating the wind field experienced by the aircraft further comprises:

subtracting the calculated unfiltered air speed $\vec{V}_A$ from a measured ground speed $\vec{V}_G$ of the aircraft resulting in a calculated unfiltered wind speed $\vec{V}_W$.

3. The method of claim 2, wherein the estimating the wind field experienced by the aircraft further comprises:

filtering the calculated unfiltered wind speed $\vec{V}_W$ with a low pass filter resulting in a calculated filtered wind speed $\vec{V}_W$.

4. The method of claim 3, wherein the estimating the airspeed of the aircraft further comprises:

subtracting the calculated filtered wind speed $\vec{V}_W$ from the measured ground speed $\vec{V}_G$ resulting in the current estimate for the airspeed $\vec{V}_A$.

5. The method of claim 1, wherein the drag force $\vec{F}_D$ is calculated by:

$$\vec{F}_D = \text{sign}(\vec{V})\vec{C}_D \frac{1}{2}\rho A \vec{V}^2$$

wherein $\vec{V}$ is the airspeed, $\vec{C}_D$ is a drag coefficient, $\rho$ is a mass density, and $A$ is a reference area.

6. The method of claim 3, wherein the estimating the wind field experienced by the aircraft further comprises:

calculating at least one of wind magnitude and wind direction from the calculated filtered wind speed $\vec{V}_W$; and displaying an indication of the at least one of wind magnitude and wind direction on a screen comprised in the aircraft.

7. The method of claim 6, wherein the indication is represented by an arrow which direction corresponds to the wind direction.

8. The method of claim 7, further comprising:

coloring the arrow so that one certain color indicates a wind magnitude within a certain wind magnitude interval.

9. The method of claim 1, wherein the airspeed is a local airspeed and wherein the wind field is a local wind field located in proximity of the aircraft.

10. The method of claim 1, wherein aerodynamics responsive to control state impacts are defined by the model of controlled aerodynamics $\vec{F}_A$.

11. The method of claim 1, wherein the aircraft is an Unmanned Aerial Vehicle, UAV.

12. A device adjusted to navigate an aircraft having a mass m, the device comprising:
- at least one of an inertial navigation unit, a Global Positioning System (GPS) unit, and an autopilot programmed to measure a ground speed associated with the aircraft;
- an accelerator configured to measure an acceleration $a_B$ of the aircraft;
- a multiplier adjusted to multiply the acceleration $a_B$ with the mass m resulting in a required aircraft force for experienced motion $\vec{F}$;
- at least one processor for calculating a controlled aerodynamics $\vec{F}_A$ by a model of the controlled aerodynamics $\vec{F}_A$ having at least a rotation rate $\vec{\omega}$ and a control state $\vec{\delta}$ of the aircraft as input in addition to a current estimate for the airspeed $\vec{V}_A$;
- a subtractor adjusted to subtract the controlled aerodynamics $\vec{F}_A$ from the required aircraft force for experienced motion $\vec{F}$ resulting in a calculated drag force $\vec{F}_D$;
- at least one processor for calculating an unfiltered airspeed $\vec{V}_A$ from the calculated drag force $\vec{F}_D$ by reverse calculation of a model of the drag force $\vec{F}_D$ being dependent on the unfiltered airspeed $\vec{V}_A$;
- at least one processor programmed to estimate an airspeed of the aircraft based on the acceleration $a_B$ of the aircraft and controlled aerodynamic forces applied to the aircraft;
- at least one processor programmed to estimate a wind field experienced by the aircraft based on the ground speed and the airspeed; and
- at least one processor being programmed to navigate the aircraft based on the estimated wind field.

13. The device of claim 12, wherein the subtractor is a first subtractor, the device further comprising:
- a second subtractor adjusted to subtract the calculated unfiltered airspeed $\vec{V}_A$ from the measured ground speed $\vec{V}_G$ of the aircraft resulting in a calculated unfiltered wind speed $\vec{V}_W$.

14. The device according to claim 13, further comprising:
- a low pass filter adjusted to filter the calculated unfiltered wind speed $\vec{V}$ resulting in a calculated filtered wind speed $\vec{V}_W$.

15. The device of claim 14, further comprising:
- a third subtractor adjusted to subtract the calculated filtered wind speed $\vec{V}_W$ from the measured ground speed $\vec{V}_G$ resulting in the current estimate for the airspeed $\vec{V}_A$.

16. A device according to claim 12, further comprising:
- at least one processor programmed to calculate the drag force $\vec{F}_D$ by:

$$\vec{F}_D = \text{sign}(\vec{V})\vec{C}_D \frac{1}{2}\rho\vec{A}\vec{V}^2.$$

wherein $\vec{V}$ is the airspeed, $\vec{C}_D$ is a drag coefficient, $\rho$ is a mass density, and $\vec{A}$ is a reference area.

17. The device of claim 16, comprising:
- at least one processor programmed to calculate at least one of wind magnitude and wind direction from the calculated filtered wind speed $\vec{V}$; and
- at least one processor programmed to display an indication of the at least one of wind magnitude and wind direction on a screen comprised in the aircraft.

18. The device of claim 17, wherein the indication is represented by an arrow which direction corresponds to the wind direction.

19. The device of claim 18, wherein the arrow is colored such that one certain color indicates a wind magnitude within a certain wind magnitude interval.

20. The device of claim 12, wherein the airspeed is a local airspeed and wherein the wind field is a local wind field located in the proximity of the aircraft.

21. The device of claim 12, wherein aerodynamics responsive to control state impacts are defined by the model of controlled aerodynamics $\vec{F}$.

22. The device of claim 12, wherein the aircraft is an Unmanned Aerial Vehicle, UAV.

* * * * *